United States Patent [19]

Yamagishi et al.

[11] Patent Number: 4,942,478
[45] Date of Patent: Jul. 17, 1990

[54] RECORDING APPARATUS

[75] Inventors: Yoichi Yamagishi, Tokyo; Makoto Takayama, Kanagawa, both of Japan

[73] Assignee: Canon Kabushiki Kaisha, Tokyo, Japan

[21] Appl. No.: 371,994

[22] Filed: Jun. 27, 1989

Related U.S. Application Data

[63] Continuation of Ser. No. 248,317, Sep. 19, 1988, abandoned, which is a continuation of Ser. No. 141,510, Jan. 7, 1988, abandoned, which is a continuation of Ser. No. 907,843, Sep. 16, 1986, abandoned.

[30] Foreign Application Priority Data

Sep. 19, 1985 [JP] Japan ............................ 60-205424

[51] Int. Cl.$^5$ ............................................. H04N 1/36
[52] U.S. Cl. .................................... 358/409; 358/437; 358/445; 358/296
[58] Field of Search ............... 358/409, 410, 411, 443, 358/445, 437

[56] References Cited

U.S. PATENT DOCUMENTS

| 4,178,471 | 12/1979 | Ohnishi ........................... 358/264 |
| 4,551,767 | 11/1985 | Higashiguchi .................. 358/264 |
| 4,620,237 | 10/1986 | Traino et al. .................. 358/264 |

Primary Examiner—Edward L. Coles, Sr.
Attorney, Agent, or Firm—Robin, Blecker, Daley & Driscoll

[57] ABSTRACT

A recording apparatus is provided with detecting means for detecting any abnormality of a synchronizing signal included in an incoming signal; processing means for processing the incoming signal into a print recording signal; and print recording means for carrying out print recording in accordance with the print recording signal. Erroneous recording is prevented by inhibiting the print recording signal from being supplied to the print recording means when any abnormality is detected in the synchronizing signal.

21 Claims, 4 Drawing Sheets

RECORDING APPARATUS

This application is a continuation of appliation Ser. No. 248,317, filed 9/19/88, now abandoned; which is a continuation of application Ser. No. 141,510, filed 1/7/88, now abandoned; which is a continuation of application Ser. No. 907,843, filed 9/16/86, now abandoned.

Background of the Invention

1. Field of the Invention

This invention relates to a recording apparatus for print recording images, letters or the like and more particularly to an apparatus which is arranged to stop print recording when any abnormality is detected in a synchronizing signal which serves as the basis of timing for various control actions.

2. Description of the Related Art

Heretofore, the apparatus of the above-stated kind has been arranged as shown in FIG. 4 of accompanying drawings. Referring to this drawing, an A/D converter 1 is arranged to receive a video signal in the form of analog image signal and to convert it into a digital signal. An A/D (analog-to-digital) controller 2 is arranged to generate a clock signal A/DCK according to a horizontal synchronizing signal Sync. The A/D converter 1 is operated according to the timing of the clock signal A/DCK. A line memory 3 is arranged to store the digital image signal produced from the A/D converter 1. A D/A converter 4 is arranged to read out the signal stored at the line memory 3 under the control of a system controller 5 and to convert it into an analog signal. A head driver 6 is arranged to drive a head to perform print recording according to the analog signal. A reference numeral 7 denotes devices of varied kinds that are to be controlled by a control signal CTRL produced from the system controller 5.

The system controller 5 is arranged to supply a signal ADC to the A/D controller 2. This signal ADC causes the A/D controller 2 to begin to operate and to supply the signal A/DCK to the A/D converter 1 in synchronism with the horizontal synchronizing signal Sync. The A/D converter 1 converts the incoming video signal on the basis of the signal A/DCK. The digital data which is thus obtained is supplied to the line memory 3. The A/D converter 1 repeatedly performs sampling after the lapse of a given period of time from arrival of the horizontal synchronizing signal Sync for every period of 1-H (one horizontal scanning period). In other words, the converter 1 performs sampling in the vertical direction perpendicular to the video signal supplied. After one line portion of the video signal is A/D converted in the vertical direction, the A/D controller 2 produces a signal $\overline{ADCE}$ which informs the system controller 5 of completion of A/D conversion. Upon receipt of the signal $\overline{ADCE}$, the system controller 5 judges the A/D conversion to have come to an end and produces the signal D/ACK to the D/A converter 4. Concurrently with this, the controller 5 produces the signal CTRL to cause thereby thee devices 7 of varied kinds to carry out printing operation on one line portion of the signal. With these processes repeatedly performed, a print of one image plane portion of the incoming video signal is obtained.

With the conventional circuit arranged in the above-stated manner, however, the A/D controller 2 comes to erroneously operate is a signal drop-out exists in the incoming synchronizing signal Sync or some noise mixes therein. In that event, the signal A/DCK which is produced from the conroller 2 becomes erroneous to disturb correct timing for the sampling action on the video signal. Then, the output of the A/D converter 1 becomes erroneous data to prevent a correct printing output from being produced. Accordingly, that results in a greatly deteriorated picture quality of print recording.

Summary of the Invention

A first object of this invention is to provide a recording apparatus which never performs recording when the picture quality of an incoming video signal deteriorates to an excessive degree in recording the video signal.

A second object of this invention is to provide a recording apparatus which never performs recording when an incoming video signal is in an inappropriate state in printing the video signal.

Under this object, a recording apparatus arranged as a preferred embodiment of this invention comprises: means for detecting any abnormality of a synchronizing signal included in an incoming signal; processing means for processing the incoming signal into a print recording signal; print recording means for carrying out print recording in accordance with the print recording signal; and inhibiting means for inhibiting the print recording signal from being supplied to the print recording means when an abnormality is detected in the synchronizing signal.

These and further objects and features of this invention will become apparent from the following detailed description of an embodiment thereof taken in connection with the accompanying drawings.

DETAILED DESCRIPTION OF THE PREFERRED EMBODIMENT

Figure 1:
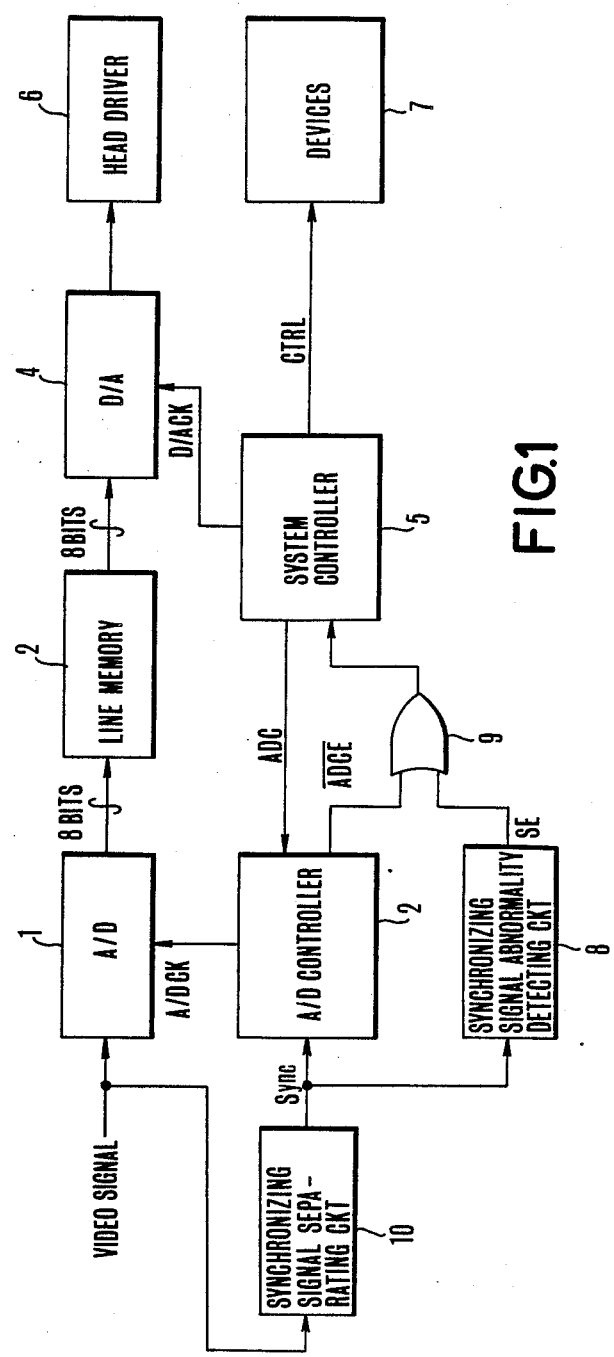
FIG. 1 is a block diagram showing an embodiment of this invention.
Figure 3:
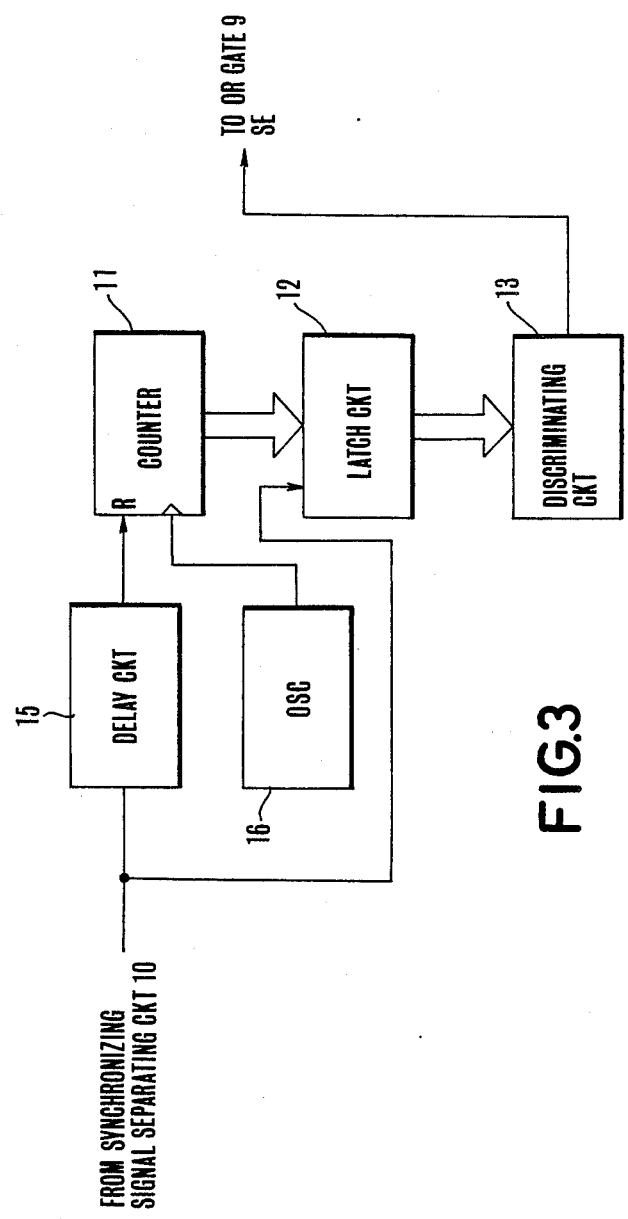
FIG. 3 is a block diagram showing the details of a detecting circuit 8 included in FIG. 1.
Figure 4:
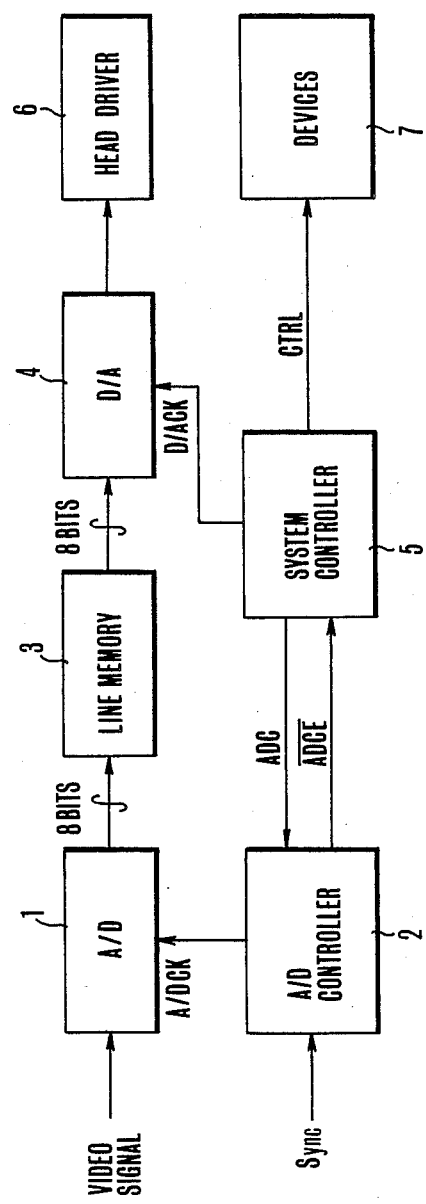
FIG. 4 is a block diagram showing an example of the conventional circuit arrangement.

The details of this invention are a described below with reference to the accompanying drawings:

FIG. 1 shows in a block diagram the circuit arrangement of a recording apparatus as an embodiment of this invention. The parts which are similar to those shown in FIG. 4 are indicated by the same reference numerals and symbols. A synchronizing signal abnormality detecting circuit 8 is arranged to receive a horizontal synchronizing sigal Sync and to detect any abnormality of the signal Sync due to a signal drop-out or a noise mixed therein. More specifically, the detecting circuit 8 counts a time interval elapsing after receipt of a vertical synchronizing signal and before receipt of a horizontal synchronizing signal or a time interval between one horizontal synchronizing signal and another horizontal synchronizing signal. The circuit 8 judges the synchronizing signal to have a drop-out when the time interval becomes longer than a normal length of time and to have a noise mixed therein when the time interval becomes shorter. FIG. 3 shows the details of arrangement of the synchronizing signal abnormality detecting circuit 8.

Referring to FIG. 3, a counter 11 is arranged to count clock pulses produced from an oscillator 16 and to be reset for a latching action of a latch circuit 12 every time a synchronizing signal which has been delayed for a given period of time by a delay circuit 15 is supplied to the reset terminal R thereof. The latch circuit is arranged to latch the output of the counter 11. The output of the counter 11 is latched by the circuit 12 every time the synchronizing signal is supplied to the counter as mentioned above. A discriminating circuit 13 is arranged to determine whether the output of the counter 11 latched by the latch circuit 12 represents an appropriate time interval of the synchronizing signal. For example, the discriminating circuit 13 judges whether or not the time interval correctly corresponds to one horizontal scanning period. If not, a signal SE indicative of an abnormality is produced from the circuit 13.

An OR gate 9 (FIG. 1) is arranged to receive a signal $\overline{\text{ADCE}}$ from the A/D controller 2 and the synchronizing signal abnormality detection signal SE from the circuit 8 and to obtain a logical sum of these signals. A synchronizing signal separating circuit 10 is arranged to separate a synchronizing signal from an incoming video signal. The output of the OR gate 9 is supplied to the system controller 5 and, in the event of any abnormality of the synchronizing signal, the signal $\overline{\text{ADCE}}$ is not transmitted to the system controller 5. The signal $\overline{\text{ADCE}}$ is a pulse signal and its fall is arranged to indicate completion of the A/D conversion process. Meanwhile, the signal SE is arranged to be at a high level in the event of any abnormality in the synchronizing signal. Therefore, the output level of the OR gate 9 becomes high when the signal SE is at a high level and then does not become low even with the signal $\overline{\text{ADCE}}$ applied to the OR gate 9. As a result the signal $\overline{\text{ADCE}}$ is not transmitted to the system controller 5. At the system controller 5, it is determined whether the signal $\overline{\text{ADCE}}$ is received within a given period of time T after a signal ADC is sent out. If the signal $\overline{\text{ADCE}}$ is not received within the period of time T, the synchronizing signal is considered to have some abnormality. In that event, the controller 5 produces a signal CTRL to the devices 7 to bring a print recording operation to a stop; and to have a recording medium such as a recording paper sheet or the like to be discharged and removed from the devices 7.

When the signal ADC is supplied to the A/D controller 2 from the system controller 5, the A/D controller 2 begins to operate in response to the signal ADC. Then, the A/D controller 2 in turn causes the A/D converter 1 to perform A/D conversion. Upon completion of the A/D conversion, the A/D controller 2 produces the signal $\overline{\text{ADCE}}$ to the OR gate 9.

In case of any abnormality in the incoming synchronizing signal Sync in this instance, the synchronizing signal abnormality detecting circuit 8 produces the synchronizing signal abnormality signal SE to the OR gate 9. This causes the output of the OR gate 9 to remain at a high level. The output level of the OR gate 9 never becomes low even in the signal $\overline{\text{ADCE}}$ is suplied thereto. Thus, the signal $\overline{\text{ADCE}}$ is prevented from being supplied to the system controller 5.

Figure 2:
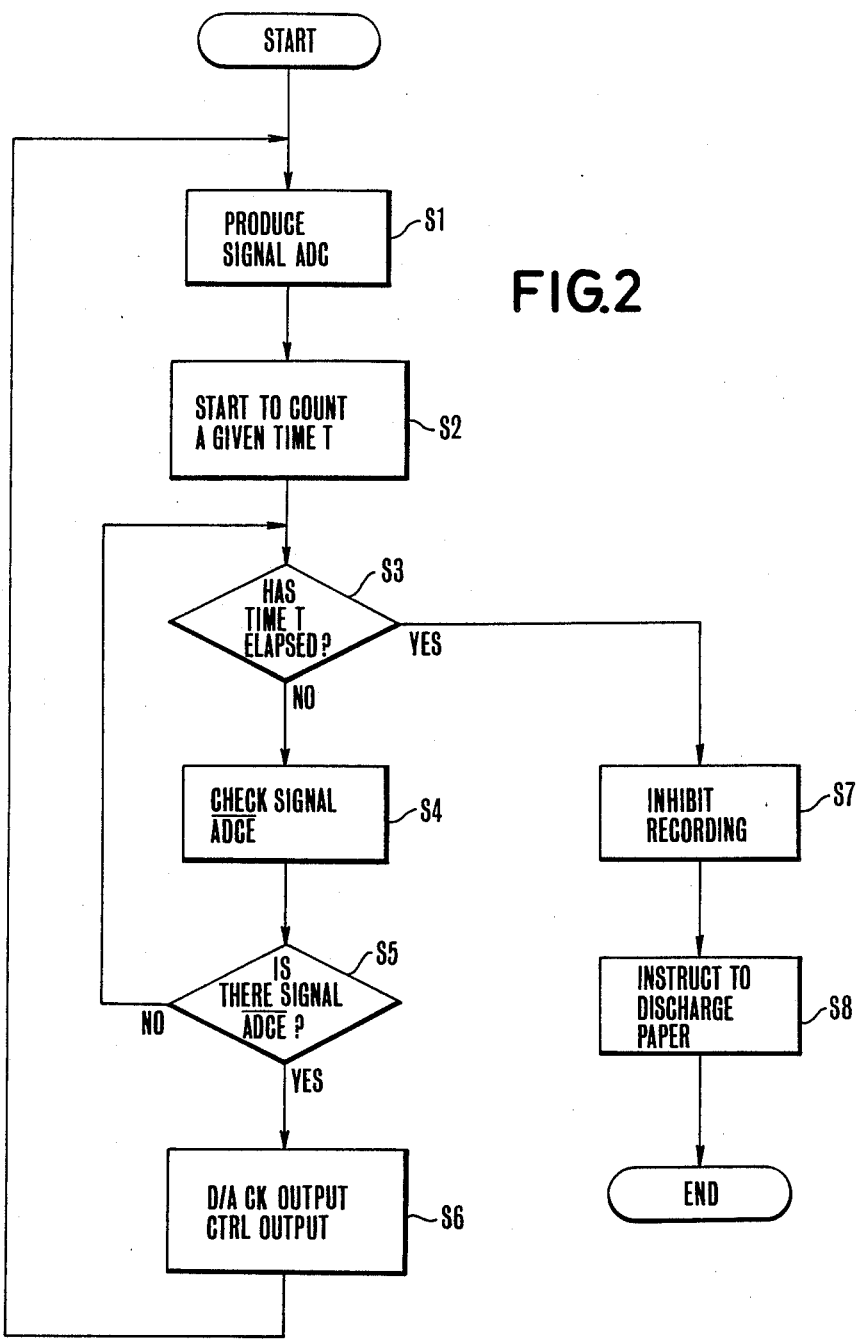
FIG. 2 is a flow chart showing by way of example control procedures employed in the same ebodiment.

The system controller 5 is arranged to detect an abnormality of the synchronizing signal through control steps which are, for example, as shown in FIG. 2. Referring to FIG. 2, the signal ADC is sent out to the A/D controller 2 at a step S1. After this, a counting action begins to count the given period of time T at a step S2. At a step S3, it is determined whether the period of time T has elapsed or not. If not, the control operation proceeds to steps S4 and S5, at which a check is made for the presence or absence of the signal $\overline{\text{ADCE}}$. If the signal $\overline{\text{ADCE}}$ is found within the period of time T, the A/D conversion process is regarded as having been completed and the operation proceeds to a step S6. At the step S6, the signal D/ACK is supplied to the D/A converter 4. At the same time, the signal CTRL is supplied to the devices 7 to cause them to carry out printing action on one line portion of the signal. With these steps of control operation repeated, a print of one picture plane portion of the incoming video signal can be obtained. In case that the signal $\overline{\text{ADCE}}$ is not transmitted within the given period of time T on the other hand, the operation of the system controller proceeds to a step S7 from the step S3. At the step S7, a control signal CTRL is produced to bring the printing action to a stop. Then, at a next step S8, the recording medium is removed from the devices 7.

In the embodiment described, a signal indicative of an abnormality of the synchronizing signal is arranged to be superimposed on another signal, i.e. the signal $\overline{\text{ADCE}}$ produced from the A/D controller 2. This arrangement obviates the necessity of providing the system controller 5 with an additional input terminal for receiving a signal indicative of an abnormality of the synchronizing signal. Therefore, the embodiment can be arranged much simpler than the conventional apparatus.

This invention is not limited to the arrangement of the specific embodiment described. The arrangement to have the synchronizing signal abnormality indicating signal superimposed on another signal of course may be replaced wih some other suitable arrangement to have such a signal supplied to the system controller 5 as it is.

In the embodiment, the synchronizing signal abnormality is arranged to be detected from the horizontal synchronizing signal. However, the invention is of course not limited to that arrangement. The invented arrangement is applicable to the detection of abnormalities in a synchronizing signal for main or auxiliary scanning or to the detection of any abnormality in a clock signal defining a timing for control over the whole apparatus.

Further, in accordance with the arrangement of the embodiment, a recording operation is brought to a stop by inhibiting the recording signal from being supplied to head driver 6 in the event of some abnormality in the synchronizing signal. In accordance with this invention, however, this arrangement may be replaced with a different arrangement in which the recording operation is brought to a stop by driving the devices 7 to discharge and remove the recording medium such as a paper sheet or the like.

In accordance with this invention, as described in the foregoing, any abnormality in the synchronizing signal is detected. In the event of such abnormality, the recording operation is brought to a stop, so that recording can be effectively prevented from being performed to have a deteriorated picture quality.

What is claimed is:

1. A recording apparatus comprising:
   (a) detecting means for detecting an abnormality of a synchronizing signal included in an incoming signal;

(b) processing means for processing said incoming signal into a print recording signal;

(c) print recording means for carrying out print recording in accordance with said print recording signal;

(d) inhibiting means for inhibiting said print recording signal from being supplied to said print recording means when the abnormality of said synchronizing signal is detected; and (e) means for instructing discharge of the recording medium following the prohibiting operation.

2. An apparatus according to claim 1, wherein said processing means includes:

(a) means for A/D converting said incoming signal;

(b) storing means for storing a signal A/D converted by said A/D converting means; and (c) D/A converting means for D/A converting said signal stored by said storing means.

3. An apparatus according to claim 1, wherein said print recording means includes a head driver which drives a head for printing.

4. An apparatus according to claim 1, wherein said inhibiting means is arranged to inhibit said print recording signal from being supplied to said print recording means by controlling the operating of said processing means.

5. An apparatus accordig to claim 2, wherein said inhibiting means is arranged to inhibit said print recording signal from being supplied to said print recording means by controlling the operation of said processing means.

6. An apparatus according to claim 5, wherein said ihibiting means is arranged to inhibit said print recording signal from being supplied to said print recording means by inhibiting said D/A converting means from operating.

7. A device for supplying a print recording signal to a printing device which is arranged to perform print recording, comprising:

(a) detecting means for detecting an abnormality of a synchronizing signal included in an incoming signal;

(b) processing means for processing said incoming signal into a print recording signal;

(c) inhibiting means for inhibiting said print recording signal from being supplied to said printing device when an abnormality is detected in said synchronizing signal; and (e) means for instructing discharge of the recording medium following the prohibiting operation.

8. A device according to claim 7, wherein said processing means includes:

(a) means for A/D converting said incoming signal;

(b) storing means for storing a signal A/D converted by said A/D converting means; and (c) D/A converting means for D/A converting said signal stored by said storing means.

9. A device according to claim 7, wherein said inhibiting means is arranged to inhibit said print recording signal from being supplied to said printing device by controlling the operation of said processing means.

10. A device according to claim 8, wherein said inhibiting means is arranged to inhibit said print recording signal for being supplied to said printing device by controlling the operation of said processing means.

11. A device according to claim 10, wherein said inhibiting means is arranged to inhibit said print recording signal from being supplied to said printing device by inhibiting said D/A converting means from operating.

12. An apparatus according to claim 1, wherein said detecting means includes:

(a) time count means for counting the time interval of said synchronizing signal; and (b) discriminating means for discriminating whether or not the time interval counted by said time count means is appropriate.

13. An apparatus according to claim 12, wherein said time count means includes a counter which is arranged to be reset according to said synchronizing signal.

14. A device according to claim 7, wherein said detecting means includes:

(a) time count means for counting the time interval of said synchronizing signal; and (b) discriminating means for discriminating whether or not the time interval counted by said time count means is appropriate.

15. A device according to claim 14, wherein said time count means includes a counter which is arranged to be reset according to said synchronizing signal.

16. A recording apparatus comprising:

(a) A/D converting means for converting an analog image signal into a digital image signal;

(b) means for performing print recording in accordance with said digital image signal;

(c) means for generating an A/D conversion completion signal indicative of completion of signal conversion by said A/D converting means;

(d) synchronizing signal abnormality detecting means for detecting the abnormality of a synchronizing signal by receiving the synchronizing signal which is arranged to provide a timing for the operation of the recording apparatus; and (e) inhibiting means for inhibiting said print recording performing means from performing print recording when an abnormality is detected in said synchronizing signal.

17. An apparatus according to claim 16, wherein said print recording performing means is arranged to perform print recording in response to said A/D conversion completion signal, said apparatus further comprising means for instructing discharge of the recording medium following the prohibiting operation.

18. An apparatus according to claim 17, wherein said inhibiting means is arranged to inhibit the generation of said A/D conversion completion signal when an abnormality is detected in said synchronizing signal by said detecting means.

19. An apparatus according to claim 16, wherein said inhibiting means is arranged to inhibit said digital image signal from being supplied to said print recording performing means.

20. An apparatus according to claim 16, wherein said synchronizing signal is included in said analog image signal.

21. A recording apparatus into which an image signal of a same image plane is repetitively fed comprising:

(a) detecting means for detecting an abnormality of a synchronizing signal included in an incoming signal;

(b) processing means for processing said incoming signal into a print recording signal for a print recording performing means; and (c) inhibiting means for inhibiting said print recording performing means from performing print recording when an abnormality is detected in said synchronizing signal; and (d) means for instruction discharge of the recording medium following the inhibiting operation.

* * * * *

UNITED STATES PATENT AND TRADEMARK OFFICE
CERTIFICATE OF CORRECTION

PATENT NO. : 4,942,478
DATED : July 17, 1990
INVENTOR(S) : Yoichi Yamagishi and Makoto Takayama It is certified that error appears in the above-identified patent and that said Letters Patent is hereby corrected as shown below:

Col. 1, line 22, after "A/D" insert -- (analog-to-digital)--

Col. 1, line 25, after "A/D" delete "(analog-to-digital)"

Col. 4, line 65, after "apparatus" insert -- into which an image signal of a same image plane is repetitively fed --

Col. 5, line 5, after "signal;" insert -- and --

Col. 5, lines 10-11, delete in their entirety

Col. 5, line 36, after "device" insert -- into which an image signal of a same image plane is repetitively fed --

Col. 5, lines 48-49, delete in their entirety

Signed and Sealed this

Twelfth Day of November, 1991

Attest:

HARRY F. MANBECK, JR.

Attesting Officer

Commissioner of Patents and Trademarks